April 28, 1925.
C. S. ASH
1,535,196
WHEEL RIM
Filed May 13, 1920
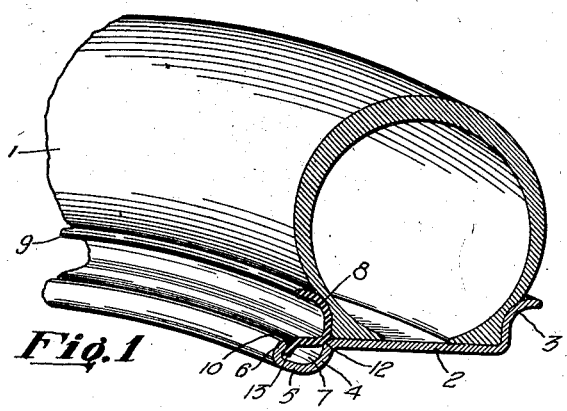
*Fig. 1*
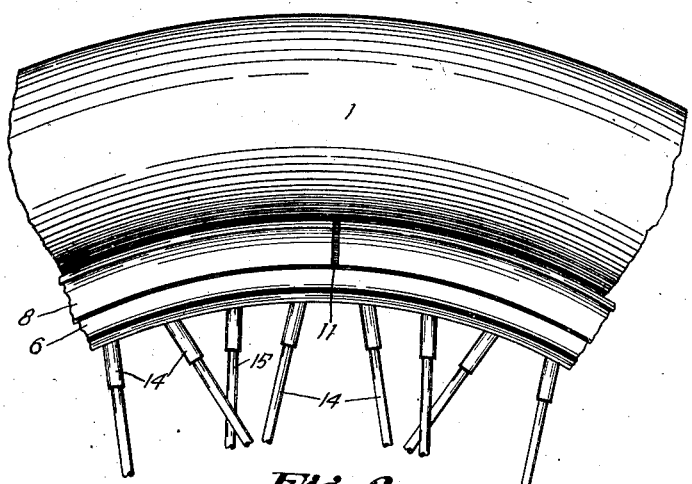
*Fig. 2*
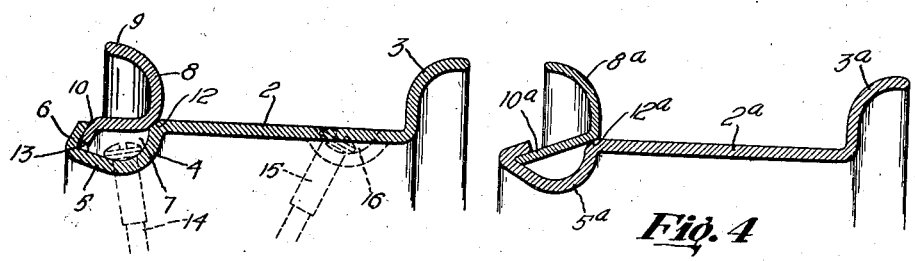
*Fig. 3*   *Fig. 4*
INVENTOR
C. S. Ash
BY
Dull, Warfield & Dull
ATTORNEYS Patented Apr. 28, 1925.

1,535,196

UNITED STATES PATENT OFFICE.

CHARLES S. ASH, OF HAGERSTOWN, MARYLAND.

WHEEL RIM.

Application filed May 13, 1920. Serial No. 381,101.

*To all whom it may concern:*

Be it known that I, CHARLES S. ASH, a citizen of the United States, residing at Hagerstown, in the county of Washington and State of Maryland, have invented certain new and useful Improvements in Wheel Rims, of which the following is a full, clear, and exact description, such as will enable others skilled in the art to which it appertains to make and use the same.

This invention relates to vehicle wheel rims for pneumatic tires, and more particularly to such rims of the so-called quick detachable straight side type.

It is an object of the invention to provide an improved means for reliably securing a tire on a wheel rim and for permitting expeditious and easy removal and application of the tire.

It is a further object to provide an improved construction of rim capable of advantageous incorporation in a detachable wheel such as the wire-spoked or disc type.

It is a further object to provide improved means of the character mentioned for seating the spoke nipples in the rim, whereby the symmetry of the rim is insured, and at the same time the rim is braced and stiffened.

It is a further object of the invention to provide a wheel rim of the character mentioned which will be structurally superior and functionally advantageous.

Other objects will be in part pointed out hereinafter in connection with the following description of the accompanying drawings which illustrate a preferred embodiment of the invention, and in which—

Figure 1 is a fragmentary perspective sectional view of a wheel rim embodying the present invention and showing a tire in position upon the rim.

Fig. 2 is a fragmentary side elevation of a vehicle wheel equipped with the invention.

Fig. 3 is a cross-sectional view of the wheel rim showing the side clamping ring in position.

Fig. 4 is a cross-sectional view similar to Fig. 3 showing a modified form of the invention.

Referring to the drawings, the numeral 1 designates a tire of the ordinary pneumatic straight side type, adapted to slide laterally into position on a metal rim 2 of a wheel shown as having wire-spokes. In order to provide means whereby the tire may be held securely in operative position and also be easily and quickly removed or applied, a novel rim construction and securing side ring are provided. At one edge of the base of the rim 2, usually the inner edge with respect to the vehicle body, is an integral upstanding flange 3 adapted to engage one edge of the tire. At the opposite or outer edge of the base of the rim is formed a downwardy extending flange 4, preferably integral with the rim base, and having a laterally extending portion 5 and an upwardly and inwardly inclined extension 6. This flange construction preferably extends entirely around the rim forming an annular depression or groove 7 in which the spoke nipples of one row or series of spokes are seated, as will be more fully hereinafter described.

In order to hold the tire firmly on the rim, a retaining or locking side ring 8. preferably of spring metal, is provided. This ring is provided with an upwardly and outwardly curved flange 9 corresponding in configuration with flange 3, and with a downwardly and outwardly inclined flange 10 which is adapted to engage the inner surface of the inclined extension 6 of the flange 5 when in operative position. This ring is preferably split or divided as shown at 11 in Fig. 2, so as to allow slight contraction or expansion thereof, and is seated when in operative position upon the rim shoulder 12 with the flange 10 in engagement with the inclined extension 6 of flange 5. In order to allow for the contraction of the ring 8, a small annular space 13 may be provided between the edge of flange 10 and the bottom of groove 7.

Heretofore difficulties in the sizing of metal rims have been encountered due to shrinkage during the ball-punching operation in forming the seats for the nipple heads. It has been very difficult to estimate the extent of oversize to roll up the rim, as the shrinkage or contraction due to the punching operation varies widely with the gauge and hardness of the metal and with other variable factors. It has therefore been correspondingly difficult to manufacture rims of uniform diameter. By the present construction such shrinkage is largely eliminated and oversizing of the rim thus avoided.

According to this construction, as particularly shown in Fig. 3, the groove 7 of flange 5 serves as a nipple seat for the outer series of wire-spokes 14, conforming approximately to the shape of the nipple heads, so that very little further forming of the rim to provide nipple seats for the outer series of spokes is required. The contraction due to the punching operation, above mentioned, is therefore avoided. The nipples of the inner series of spokes 15 are seated in the usual manner as in spherical depressions 16 punched from the body of rim 2. However, as there are only half the number of spokes in the inner series as there are in the outer series, and furthermore as the inner edge of the rim is stiffened by the flange 3, no objectionable shrinkage of the rim will result from the punching of these spherical depressions. It will therefore be unnecessary to estimate for oversizing in order to produce a finished rim of exact predetermined dimensions.

As the spoke nipples of the outer series of spokes are all placed in the groove 7 of flange 5, entirely outside of the base of the tire, there will be no contact between the tire and the nipples, and consequently a source of possible damage to the tire is avoided. Furthermore, it will be noted that the outer series of spokes lie wholly outside the bases of the rim and tire and that a greater lateral angle to the outer series of spokes is thus provided. By this means the rim is materially stiffened and braced, particularly against lateral thrusts.

The operation of the construction described above, briefly is as follows:

Assuming that it is desired to place a tire on a rim, and that the retaining ring 8 is removed therefrom, the tire is moved laterally on to the base of the rim to the position shown in Fig. 1. The ring 8 is then expanded slightly and allowed to spring in position with the inclined flange 10 in engagement with the inclined extension 6 of the flange 5. As the tire is inflated, pressure therefrom forces the ring slightly outwardly (transversely), the flange 10 sliding over the inclined extension 6. This causes a wedging action of the inclined flange against the extension 6 tending to contract or decrease the diameter of the ring 8, thereby forcing it firmly into locking position on the rim against shoulder 12 and inclined extension 6. When the tire is deflated, the ring is easily removed by expanding the same slightly by use of a suitable tool, an ordinary screw driver being convenient for this purpose. For the purpose of facilitating the insertion of the screw driver in removing the ring, a small opening may be provided by cutting away a portion of the inclined flange 10, preferably near the division point of the ring.

In the modified form of the invention illustrated in Fig. 4, the inclined flange of the clamping ring $8^a$ rests tightly against the inner surfaces of the flange $5^a$ and the inclined extension thereof. It will thus be seen that no space is provided between the inclined flange of the ring and flange $5^a$ of the rim, the ring in this case bearing upon the rim both at the shoulder $12^a$ thereof and the bottom of flange $5^a$.

Having described my invention, what I claim as new and desire to secure by Letters Patent is:

The combination with a wheel rim having on one edge a tire retaining flange and on the other edge a depressed flange adapted to serve as a nipple seat, said depressed flange having an inclined extension converging toward the wheel axis, of a split ring comprising a tire retaining flange adapted to seat on the edge of said rim and a flange adapted to engage with said inclined extension.

In testimony whereof I affix my signature, in the presence of two witnesses.

CHARLES S. ASH.

Witnesses:
L. A. WATSON,
M. A. CASKIN.